(12) United States Patent
Fyvie et al.

(10) Patent No.: US 8,002,851 B2
(45) Date of Patent: Aug. 23, 2011

(54) THERMOCHROMIC INK AND COATING COMPOSITIONS

(75) Inventors: Thomas Joseph Fyvie, Schenectady, NY (US); David Gilles Gascoyne, Niskayuna, NY (US); Andrea Jeannine Peters, Clifton Park, NY (US); Marc Brian Wisnudel, Glen Rock, NJ (US)

(73) Assignee: NBCUniversal Media LLC, New York, NY (US)

( * ) Notice: Subject to any disclaimer, the term of this patent is extended or adjusted under 35 U.S.C. 154(b) by 343 days.

(21) Appl. No.: 12/403,930

(22) Filed: Mar. 13, 2009

(65) Prior Publication Data

US 2010/0234504 A1    Sep. 16, 2010

(51) Int. Cl.
C09D 11/00    (2006.01)

(52) U.S. Cl. .......... 8/506; 8/522; 8/638; 106/31.13; 106/31.27; 106/31.96

(58) Field of Classification Search .......... 8/506, 522, 8/638; 106/31.13, 31.27, 31.96
See application file for complete search history.

(56) References Cited

U.S. PATENT DOCUMENTS

| | | | | |
|---|---|---|---|---|
| 5,527,385 | A * | 6/1996 | Sumii et al. | 106/31.17 |
| 6,090,193 | A * | 7/2000 | Nigam et al. | 106/31.27 |
| 6,139,779 | A * | 10/2000 | Small et al. | 252/583 |
| 6,783,991 | B1 * | 8/2004 | Mehta et al. | 436/164 |
| 6,790,501 | B2 | 9/2004 | Van de Grampel et al. | |
| 6,795,464 | B2 | 9/2004 | Lawandy | |
| 7,227,445 | B2 | 6/2007 | Atkinson | |
| 2002/0163479 | A1 | 11/2002 | Lin et al. | |
| 2003/0081521 | A1 | 5/2003 | Solomon et al. | |
| 2004/0022542 | A1 | 2/2004 | Atkinson | |
| 2004/0054594 | A1 | 3/2004 | Forster et al. | |
| 2004/0083377 | A1 | 4/2004 | Wu et al. | |
| 2005/0005285 | A1 | 1/2005 | Olson et al. | |
| 2005/0110978 | A1 | 5/2005 | Potyrailo et al. | |
| 2005/0167510 | A1 | 8/2005 | Potyrailo et al. | |
| 2006/0005326 | A1 * | 1/2006 | Rollat-Corvol et al. | 8/405 |
| 2006/0028924 | A1 | 2/2006 | Atkinson | |
| 2006/0040400 | A1 * | 2/2006 | Mizutani et al. | 436/63 |

(Continued)

FOREIGN PATENT DOCUMENTS

JP    05159365 A    6/1993

(Continued)

OTHER PUBLICATIONS

Dr. Patrick Collins; "Equatorial Times No. 3"; The Newsletter of the SPS 2000 Community Around the World, Dec. 1996. Available at http://www.spacefuture.com/power/equatorialtimes/3.shtml.

(Continued)

*Primary Examiner* — Lorna M Douyon
*Assistant Examiner* — Tri V Nguyen
(74) *Attorney, Agent, or Firm* — Fletcher Yoder

(57) ABSTRACT

A thermochromic ink composition comprises at least one thermochromic optical-state change material, at least one thermally responsive pH modifier, and at least one base and at least one binder material. The quantity of the thermally responsive pH modifier is less than or equal to about 0.25 milli moles based on the amount of optical-state change material. The ink composition is capable of transforming from a first optical state to a second optical state upon exposure to a thermal stimulus. The thermochromic ink composition may comprise a nitro dye. A thermochromic coating composition formed using the thermochromic ink composition is also disclosed.

17 Claims, 2 Drawing Sheets

U.S. PATENT DOCUMENTS

| | | | |
|---|---|---|---|
| 2006/0234003 A1 | 10/2006 | Selinfreund | |
| 2007/0142502 A1* | 6/2007 | Zhu et al. | 523/161 |
| 2007/0240607 A1* | 10/2007 | Vincent Kwan et al. | 106/31.16 |
| 2009/0036304 A1* | 2/2009 | Misner et al. | 503/201 |

FOREIGN PATENT DOCUMENTS

| | | |
|---|---|---|
| WO | WO98/40930 A1 | 9/1998 |
| WO | WO9967085 A | 12/1999 |
| WO | WO2004/070718 A1 | 8/2004 |
| WO | WO2007061774 A1 | 5/2007 |
| WO | WO2007061974 A1 | 5/2007 |

OTHER PUBLICATIONS

WO Search Report, PCT/US2007/77230, Apr. 16, 2008.

* cited by examiner

THERMOCHROMIC INK AND COATING COMPOSITIONS

BACKGROUND

The invention includes embodiments that relate to a thermochromic ink composition. More particularly, the invention includes embodiments that relate to a thermochromic ink composition and a thermochromic coating composition for use as part of an anti-theft system for optical articles.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed circuit surveillance cameras may be located at such places, theft still occurs. Retail products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor/anti-theft tags may be easily removed.

Therefore, there is a continued need to provide techniques and systems that can assist in reducing the incidence of, and damage caused by, stolen media.

BRIEF DESCRIPTION

Figure 1:
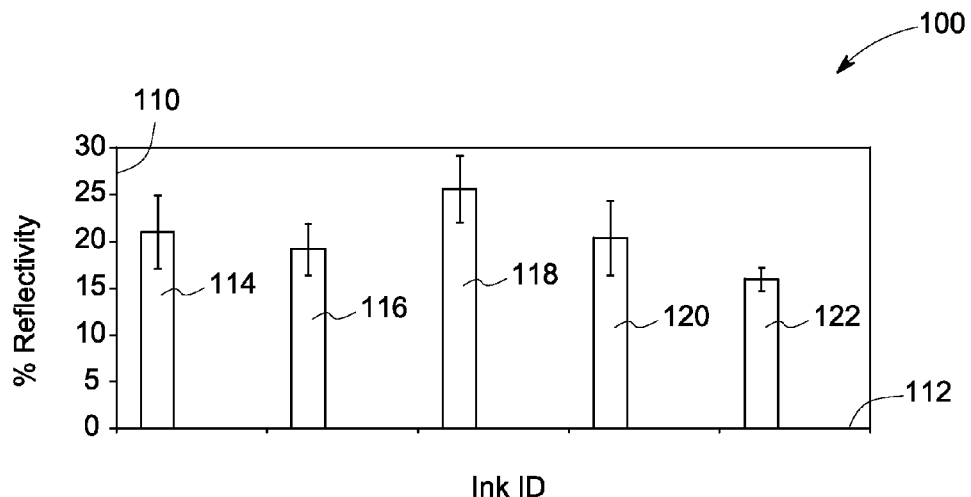
FIG. 1 illustrates the initial reflectivity of thermochromic coating compositions coated on an optical article, prepared in accordance with embodiments described herein.

One embodiment of the invention is directed to a thermochromic ink composition comprising at least one thermochromic optical-state change material, at least one thermally responsive pH modifier, and at least one base and at least one binder material. The quantity of the thermally responsive pH modifier is less than or equal to about 0.25 milli moles based on the thermochromic optical-state change material. The thermochromic ink composition is capable of transforming from a first optical state to a second optical state upon exposure to a thermal stimulus.

Another embodiment of the invention is directed to a thermochromic ink composition comprising at least one thermochromic optical-state change material consisting of sodium salt of bromothymol blue, at least one thermally responsive pH modifier, and at least one base and at least one binder material. The quantity of the thermally responsive pH modifier is less than or equal to about 0.25 milli moles based on the thermochromic optical-state change material. The thermochromic ink composition is capable of transforming from a first optical state to a second optical state upon exposure to a thermal stimulus.

Another embodiment of the invention is directed to a thermochromic ink composition comprising at least one thermochromic optical-state change material, at least one nitro dye having a Formula I:

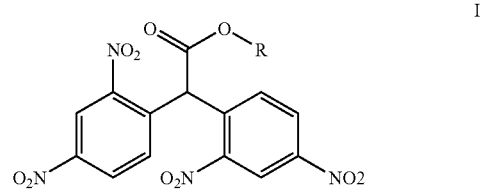

wherein R comprise hydrogen or an alkyl group having 1 to 8 carbon atoms, at least one thermally responsive pH modifier, at least one base, and at least one binder material; wherein the quantity of the thermally modified pH modifier is less than or equal to about 0.25 milli moles based on the amount of optical-state change material; and wherein the thermochromic ink composition is capable of transforming from a first optical state to a second optical state upon exposure to a thermal stimulus.

Another embodiment of the invention is directed to a thermochromic ink composition comprising at least one thermochromic optical-state change material consisting of sodium salt of bromothymol blue, at least one nitro dye having a Formula I, wherein R comprise hydrogen or an alkyl group having 1 to 8 carbon atoms; at least one thermally responsive pH modifier, at least one base, and at least one binder material. The quantity of the thermally modified pH modifier is less than or equal to about 0.25 milli moles based on the thermochromic optical-state change material. The thermochromic ink composition is capable of transforming from a first optical state to a second optical state upon exposure to a thermal stimulus.

Another embodiment of the invention is directed to a thermochromic coating composition comprising at least one thermochromic optical-state change material, at least one thermally responsive pH modifier, at least one base, and at least one binder material. The quantity of the thermally responsive pH modifier is less than or equal to about 0.25 milli moles based on the thermochromic optical-state change material. The thermochromic coating composition is capable of transforming from a first optical state to a second optical state upon exposure to a thermal stimulus. The thermochromic coating composition is essentially free of solvent.

Another embodiment of the invention is directed to an article comprising a thermochromic ink composition deposited in or deposited on the article. The thermochromic ink composition comprises; at least one thermochromic optical-state change material, at least one thermally responsive pH modifier, at least one base and at least one binder material. The quantity of the thermally modified pH modifier is less than or equal to about 0.25 milli moles based on the optical-state change material. The thermochromic ink composition is capable of transforming from a first optical state to a second optical state upon exposure to a thermal stimulus.

These and other advantages and features will be more readily understood from the following detailed description of preferred embodiments of the invention that is provided in connection with the accompanying drawing.

DETAILED DESCRIPTION

One solution to this shoplifting problem, specifically for optical media articles such as DVD's, is to render at least a portion of the content of the DVD inaccessible unless the retailer at the point-of-sale has activated the DVD. While following this approach it should be taken into consideration that the time to activate the DVD at the POS should be minimized while at the same time the shelf life of the inactive DVD should be maximized. One approach to rendering the content of the DVD inaccessible prior to activation is to employ a thermochromic ink composition to deposit a thermochromic coating composition in or on the DVD, wherein the thermochromic coating composition at least partially absorbs the incident laser from an optical data reader so that the complete data directly in the optical path of the laser cannot be read. In this instance, the optical article has no value, and therefore there is no incentive for the shoplifter to steal it. However, upon converting the DVD to an "activated" state using an external stimulus at the point-of-sale, the thermochromic coating composition becomes sufficiently transparent, with respect to the wavelength of the laser employed in the optical data reader, due to a change in the optical properties of the thermochromic coating composition, and the complete data directly in the optical path of the laser can now be read by the incident laser from the optical data reader, therefore rendering the full content of the DVD accessible to a legitimate consumer.

Various embodiments of thermochromic ink compositions, thermochromic coating compositions, articles comprising thermochromic coating compositions, and stability of the thermochromic coating compositions on the articles are described below. Aspects of the embodiments described herein can be used in combination with the materials, systems and techniques previously disclosed in U.S. patent application Ser. Nos. 11/538,451, 11/567,271 and 11/831,180, to inhibit the theft or unauthorized use of optical articles. Thus the disclosures of U.S. patent application Ser. No. 11/538,451, filed Oct. 4, 2006, U.S. patent application Ser. No. 11/567,271, filed Dec. 6, 2006, U.S. patent application Ser. No. 11/831,180, filed Jul. 31, 2007, are hereby incorporated by reference in their entireties.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

As used herein, the terms "disposed over" or "deposited over" or "disposed between" refer to both disposed directly in contact with and indirectly by having intervening layers therebetween. "Operably coupled" is a relationship between listed parts that provides a stated function.

One embodiment of the invention is directed to a thermochromic ink composition comprising at least one thermochromic optical-state change material, at least one thermally responsive pH modifier, and at least one base and at least one binder material. The quantity of the thermally responsive pH modifier is less than or equal to about 0.25 milli moles based on the thermochromic optical-state change material. The thermochromic ink composition is capable of transforming from a first optical state to a second optical state upon exposure to a thermal stimulus.

In one embodiment, the pH of the ink composition is due to a change in concentration of the thermally responsive pH modifier within the coating. In one embodiment, the change in pH of the ink composition is due to a change in concentration of the thermally responsive pH modifier within the ink composition due to evaporation, sublimation, or degradation of the thermally responsive pH modifier. In one embodiment, the change in concentration of the thermally responsive pH modifier within the ink composition is irreversible.

The term "thermochromic" as used herein, describes materials that undergo either a reversible or an irreversible thermally induced color change. As used herein the term "optical-state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm.

One suitable halochromic optical-state change material that may be used in the thermochromic ink composition is a chromic dye. As described herein the term "halochromic" describes a material which changes optical state for example, color, upon a change in pH i.e., a change in the acidity or basicity results in a change in the optical absorbance of the chromic dye. This process is also known as "acidic-chromism" or "halochromism". For example, the thermochromic ink composition may contain a thermochromic dye i.e., a pH responsive dye such as for example a triaryl methylene dye. One example of a triaryl methylene dye is the sodium salt of bromothymol blue, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the thermochromic ink composition. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

As used herein, the term "chromic dye" describes optical-state change dyes which can exist in two different color forms between about 200 nm to about 800 nm. In one embodiment, the chromic dye is a triarylmethylene dye. Suitable non-limiting examples of triarylmethylene dyes include bromocresol green, bromocresol purple, and corresponding salts thereof. Non-limiting examples of thermochromic optical-state change materials include but are not limited to bromocresol green, bromocresol purple, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, carmine, and corresponding salts thereof. In one embodiment, the optical-state change material is sodium salt of bromothymol blue.

In one embodiment, the amount of the optical-state change material is in a range of from about 25 weight percent to about 35 weight percent based on the weight of a coating formed using the composition. In another embodiment, the amount of the optical-state change material is in a range of from about 28 weight percent to about 32 weight percent based on the weight of a coating formed using the composition. In yet another embodiment, the amount of the optical-state change material is in a range of from about 29 weight percent to about 31 weight percent based on the weight of a coating formed using the composition.

The quantity of the thermally responsive pH modifier appears to play an important role in the thermochromic ink composition and the thermochromic coating composition prepared therefrom. In one embodiment, the quantity of the thermally responsive pH modifier is in a range of from about 0.01 milli moles to about 1 milli mole based on the amount of optical-state change material. In another embodiment, the quantity of the thermally responsive pH modifier is in a range of from about 0.05 milli moles to about 0.5 milli mole based on the amount of optical-state change material. In yet another embodiment, the quantity of the thermally responsive pH modifier is in a range of from about 0.1 milli moles to about 0.35 milli mole based on the amount of optical-state change material. In one embodiment, the thermally responsive pH modifiers may be selected from one or more of sulfonic acid salts, phosphoric acid salts, hydrochloric acid salts, triflic acid salts, alkali metal salts, amine salts, ammonium salts, iodonium salts, and benzoic acid. Specific non-limiting examples of the thermally responsive pH modifiers include dinonylnaphthalene sulfonate, dodecylbenzene sulfonate, p-toluenesulfonate, (4-phenoxyphenyl)diphenylsulfonium trifluoromethanesulfonate, bis(4-t-butylphenyl)iodonium p-toluenesulfonate, (4-t-butylphenyl)diphenlsulfonium triflate, triphenylsulfonium triflate, diphenyliodonium- hexafluorophosphate, ethyl p-toluenesulfonate, dipenyliodonium chloride, 4-octyloxyphenyl phenyl iodonium fluoroantimonate, ammonium hexafluroantimonate, and ethyl benzoate.

In one embodiment, the thermochromic ink composition further comprises a nitro dye having a Formula I, wherein R comprises hydrogen or an alkyl group including 1 to 8 carbons. In one embodiment, R comprises hydrogen, methyl and ethyl groups. Non limiting examples of nitro dyes include but are not limited to bis(2,4-dinitrophenyl)acetic acid ethyl ester, (2,4-dinitrophenyl)acetic acid methyl ester, and (2,4-dinitrophenyl)acetic acid. In one embodiment, the nitro dye comprises bis(2,4-dinitrophenyl)acetic acid ethyl ester. In one embodiment, the amount of the nitro dye may be less than or equal to about 1.0 milli moles based on the amount of the optical-state change material. In another embodiment, the amount of the nitro dye may be in a range of about 0.1 milli moles to about 0.75 milli moles based on the amount of the optical-state change material. In yet another embodiment, the amount of the nitro dye may be in a range of about 0.2 milli moles to about 0.4 milli moles based on the amount of the optical-state change material.

The base may primarily be employed to increase the pH of the ink and to ensure that the dye is in the basic form to start with, i.e., the deeply colored form. In various embodiments, the amount of the base employed depends on the dye, the pH at which the color change occurs, etc. In certain embodiments, additional base may also help increase the color stability. Suitable non-limiting examples of bases include one or more of ammonia, triethylamine, methyl amine, cyclohexylamine, dicyclohexylamine, 1,8-bis(dimethylamino)naphthalene, 1,4-diazabicyclo[2.2.2]octane, dimethyl-4-methoxybenzylphenyl ammonium hexafluoroantimonate, dimethyl-4-methylbenzyl, phenyl ammonium hexafluoroantimonate; benzyldimethylphenyl ammonium hexafluoroantimonate, dimethyl-4-methoxybenzyl4-methylphenyl ammonium triflate, dimethyl-4-methylbenzyl, phenyl ammonium triflate, benzyldimethylmethyl phenylammonium triflate, pyridine, imidazole, potassium hydroxide, and sodium hydroxide. In one embodiment, the base comprises dicyclohexyl amine or dimethyl-4-methoxybenzylphenyl ammonium hexafluoroantimonate or a combination thereof. In one embodiment, the amount of the base is in a range of from about 0.5 milli moles to about 4.0 milli moles based on the amount of optical-state change material. In another embodiment, the amount of the base is in a range of from about 1.0 milli moles to about 3.0 milli moles based on the amount of optical-state change material. In yet another embodiment, the amount of the base is in a range of from about 2.0 milli moles to about 2.5 milli moles based on the amount of optical-state change material.

In another embodiment, wherein the thermochromic ink composition is used to deposit a thermochromic coating composition, the solubility of the different components of the thermochromic ink composition in the solvent should be such that there will be no phase separation of the different components during the post-deposition drying step. In a further embodiment, wherein the thermochromic ink composition is used to deposit a thermochromic coating composition on an article suitable solvents include those that exhibit a chemical inertness towards the material used to form the article. For example if the article is an optical article such as for example a DVD made using a polycarbonate, the selected solvent(s) should not induce solubilization, crystallization, or any other form of chemical or physical attack of the polycarbonate. This is essential to preserve the readability of the data underneath the thermochromic coating composition. In one embodiment, in the case of solvent mixtures the volume fraction of any solvent that could potentially attack the polycarbonate may be less than about 30 percent. As used herein the term "surface tension" refers to a property of the liquid that affects the spreading of a liquid on a surface. The surface tension will have a dramatic result on the final shape of a drop or multiple drops of liquid printed on solid surfaces. With respect to the ink formulations of the present disclosure, surface tension is a critical parameter for printing the ink formulations using conventional printing techniques such as, but not limited to, inkjet printing and screen printing. Surface tension is also a parameter for the jetting process itself during inkjet printing, as it will affect how drops are formed at the print-head. If the surface tension is not appropriate, inks will not be jettable with inkjet printing.

Other aspects of suitable solvents include, but are not limited to, low vapor pressure and high boiling points so that the thermochromic ink is printable by methods known to one skilled in the art, such as for example, screen printing or ink-jet printing methods. Solvents with lower boiling points may evaporate rapidly from the ink, causing clogging of inkjet print head nozzles or drying onto a printing screen, either of which can lead to poor quality of the resultant thermochromic coating. In one embodiment, a solvent with a boiling point above 130 degrees Celsius is employed. In various embodiments, the thermochromic ink composition should be a physical mixture of the various components and there should be no reactivity between the components at least under ambient conditions.

In one embodiment, suitable solvents employed in the thermochromic ink composition include, but are not limited to a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, an oxygenated hydrocarbon solvent, or miscible combinations thereof. Some specific suitable non-limiting examples of such solvents include diacetone alcohol (DAA), dipropylene glycol methyl ether (Dowanol DPM), propylene glycol methyl ether (Dowanol PM), butyl carbitol, ethylene glycol, glycerol with glycol ethers, cyclohexanone, and miscible combinations thereof. In one embodiment, the amount of the solvent is in a range of from about 80 weight percent to about 90 weight percent based on the weight of the ink composition. In another embodiment, the amount of the solvent is in a range of from about 83 weight percent to about 87 weight percent based on the weight of the ink composition. In yet another embodiment, the amount of the solvent is in a range of from about 84 weight percent to about 85 weight percent based on the weight of the ink composition.

The primary function of the binder materials is to assist the adherence of a thermochromic ink composition to the surface of an article on which the thermochromic ink composition is deposited. Suitable non-limiting examples of binder materials include one or more of a polymer, an oligomer, a polymeric precursor, and a polymerizable monomer. Suitable non-limiting examples of polymeric materials include poly(alkenes), poly(anilines), poly(thiophenes), poly(pyrroles), poly(acetylenes), poly(dienes), poly(acrylates), poly(methacrylates), poly(vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly(esters), poly(anhydrides), poly(urethanes), poly(sulfonates), poly(siloxanes), poly(sulfides), poly(thioesters), poly(sulfones), poly(sulfonamides), poly(amides), poly(ureas), poly(phosphazenes), poly(silanes), poly(silazanes), poly(benzoxazoles), poly(oxadiazoles), poly(benzothiazinophenothiazines), poly(benzothiazoles), poly(pyrazinoquinoxalines), poly(pyromellitimides), poly(quinoxalines), poly(benzimidazoles), poly(oxindoles), poly(oxoisoindolines), poly(dioxoisoindolines), poly(triazines), poly(pyridazines), poly(piperazines), poly(pyridines), poly(piperidines), poly(triazoles), poly(pyrazoles), poly(pyrrolidines), poly(carboranes), poly(oxabicyclononanes), poly(dibenzofurans), poly(phthalides), poly(acetals), poly(anhydrides), carbohydrates, blends of the above polymeric materials, and copolymers thereof. In one embodiment, the thermochromic ink composition comprises a polymerizable monomer, such as an acrylate monomer (e.g., methyl methacrylate), which can be polymerized (i.e. cured) to form a thermochromic coating after the thermochromic ink composition has been deposited on an optical article. In one embodiment, the amount of the binder material is in a range from about 20 weight percent to about 60 weight percent based on a weight of a coating formed using the composition. In another embodiment, the amount of the binder material is in a range from about 30 weight percent to about 50 weight percent based on a weight of a coating formed using the ink composition. In yet another embodiment, the amount of the binder material is in a range of about 35 weight percent to about 45 weight percent based on a weight of a coating formed using the ink composition.

As discussed above, the thermochromic ink composition is capable of transforming from a first optical state to a second optical state upon exposure to a thermal stimulus. The change from the first optical state to the second optical state occurs due to the presence of the thermochromic optical-state change material. In one embodiment, the thermochromic transformation from the first optical state to the second optical state is a bistable transformation. As used herein, the term "bistable transformation" is defined as a condition where the optical state of the thermochromic ink composition corresponds to one of two possible free energy minima and the ink composition remains in its current optical state in the absence of an external thermal stimulus that raises the composition's temperature about 25 degrees Celsius. In one embodiment, the thermochromic ink composition is transformed from the first optical state to the second optical state in a temperature range of from about 25 degrees Celsius to about 200 degrees Celsius. In another embodiment, the thermochromic ink composition is transformed from the first optical state to the second optical state in a temperature range of from about 50 degrees Celsius to about 190 degrees Celsius. In yet another embodiment, the thermochromic ink composition is transformed from the first optical state to the second optical state in a temperature range of from about 100 degrees Celsius to about 180 degrees Celsius.

The thermochromic ink composition may primarily find a use in security applications. For example, if the thermochromic ink composition is applied as a thermochromic coating composition on a DVD, and the DVD is to be legitimately activated by a authorized store personnel at the POS, the time taken for the activation should be conveniently short. If the activation takes too much time one may find long queues at the POS. In one embodiment, the time taken for a coating comprising this composition in an optical article to bleach in presence of a thermal source is less or equal to about 6 seconds. In another embodiment, the time taken for a coating comprising this composition in an optical article to bleach in presence of a thermal source is less or equal to about 4 seconds. In yet another embodiment, the time taken for a coating comprising this composition in an optical article to bleach in presence of a thermal source is less or equal to about 2 seconds. In one embodiment, the optical reflectivity of the coating after interaction with the thermal source is in a range of about 40 percent to about 100 percent. In another embodiment, the optical reflectivity of the coating after interaction with the thermal source is in a range of about 65 percent to about 100 percent. In yet another embodiment, the optical reflectivity of the coating after interaction with the thermal source is in a range of about 90 percent to about 100 percent. In another embodiment, the time take for a film comprising this composition to bleach in the presence of a thermal source of varying intensities is shown in Table 2 and discussed further, below.

Further, as much as one would like the DVD's to be activated in a minimum time period in the presence of a legitimate thermal source, the thermochromic coating composition should provide a long shelf life to the inactive DVD, i.e., the composition should not degrade or decompose or self-activate under normal storage conditions, say for example, at a temperature of about 25 to 50 degrees Celsius in the presence of air. In one embodiment, the time taken for a coating comprising this composition in an optical article to bleach under storage at a temperature of about 25 degrees Celsius is about 3 months to about 24 months. In another embodiment, the time taken for a coating comprising this composition in an optical article to bleach under storage at a temperature of about 25 degrees Celsius is about 6 months to about 12 months. In yet another embodiment, the time taken for a coating comprising this composition in an optical article to bleach under storage at a temperature of about 25 degrees Celsius is about 8 months to about 10 months.

In one embodiment, the optical reflectivity of the coating after storage in the pre-activated state is less than or equal to about 30 percent. In another embodiment, the optical reflectivity of the coating after storage pre-activated state is in a range of about 10 percent to about 25 percent. In yet another embodiment, the optical reflectivity of the coating after storage pre-activated state is in a range of about 15 percent to about 20 percent.

In one embodiment, the thermochromic ink composition has a maximum optical absorbance in a range of about 200 nm to about 800 nm. In another embodiment, the thermochromic ink composition has a maximum optical absorbance in a range of about 300 nm to about 700 nm. In yet another embodiment, the thermochromic ink composition has a maximum optical absorbance in a range of about 400 nm to about 650 nm. It will be appreciated that the specific wavelengths for which the absorbance of the composition is maximized may be chosen to correspond to a particular application. For instance, if the composition is intended for use with DVD systems, the choice of wavelength should desirably correspond to the wavelengths in use in DVD players.

In another embodiment, the invention is directed to a thermochromic ink composition comprising at least one thermochromic optical-state change material consisting of sodium salt of bromothymol blue, at least one thermally responsive pH modifier, and at least one base and at least one binder material. The quantity of the thermally responsive pH modifier is less than or equal to about 0.25 milli moles based on the amount of optical-state change material. The thermochromic ink composition is capable of transforming from a first optical state to a second optical state upon exposure to a thermal stimulus.

In yet another embodiment, the invention is directed to an article comprising at least one thermochromic ink composition consisting of an optical-state change material, at least one nitro dye having a Formula I; wherein R comprises an hydrogen or an alkyl group including 1 to 8 carbons; at least one thermally responsive pH modifier, at least one base, and at least one binder material; wherein the quantity of the thermally modified pH modifier is less than or equal to about 0.25 milli moles based on the amount of optical-state change material; and wherein the ink composition is capable of transforming from a first optical state to a second optical state upon exposure to a thermal stimulus.

In still yet another embodiment, the invention is directed to a thermochromic ink composition comprising at least one thermochromic optical-state change material consisting of sodium salt of bromothymol blue, at least one nitro dye having a Formula I; wherein R comprises an hydrogen or an alkyl group including 1 to 8 carbons; at least one thermally responsive pH modifier, at least one base, and at least one binder material; wherein the quantity of the thermally modified pH modifier is less than or equal to about 0.25 milli moles based on the amount of optical-state change material; and wherein the ink composition is capable of transforming from a first optical state to a second optical state upon exposure to a thermal stimulus.

In still yet another embodiment, the invention is directed to an article comprising a thermochromic ink composition deposited in or deposited on the article, wherein the thermochromic ink composition comprises; at least one thermochromic optical-state change material, at least one thermally responsive pH modifier, at least one base and at least one binder material; wherein the quantity of the thermally responsive pH modifier is less than or equal to about 0.25 milli moles based on the optical-state change material; and wherein the ink composition is capable of transforming from a first optical state to a second optical state upon exposure to a thermal stimulus.

Another embodiment of the invention is directed to an article comprising a thermochromic ink composition deposited in or deposited on the article. The thermochromic ink composition comprises; at least one thermochromic optical-state change material, at least one thermally responsive pH modifier, at least one base and at least one binder material. The quantity of the thermally modified pH modifier is less than or equal to about 0.25 milli moles based on the optical-state change material. The ink composition is capable of transforming from a first optical state to a second optical state upon exposure to a thermal stimulus.

In another embodiment, the invention is directed to a thermochromic coating composition comprising at least one thermochromic optical-state change material, at least one thermally responsive pH modifier, and at least one base and at least one binder material. The quantity of the thermally responsive pH modifier is less than or equal to about 0.25 milli moles based on the amount of optical-state change material. The coating composition is capable of transforming from a first optical state to a second optical state upon exposure to a thermal stimulus. The coating composition is essentially free of solvent.

As used herein, the term "coating" describes a layered film structure. In certain embodiments, the layered film structure may comprise a single layer. In one embodiment, the thickness of the coating is in a range from about 0.1 micron to about 100 microns. In another embodiment, the thickness of the coating is in a range from about 0.2 micron to about 10 microns. In yet another embodiment, the thickness of the coating is in a range from about 0.25 micron to about 5 microns.

In one embodiment, the thermochromic coating composition may be deposited on an article using the thermochromic ink composition by employing methods known to one skilled in the art. For example, screen printing and ink-jet printing methods can be used. In one embodiment, the article is an optical article. The thermochromic ink composition may be converted to the corresponding thermochromic coating composition, using methods known to one skilled in the art. Exemplary methods include air drying at ambient conditions, drying under controlled temperature conditions such as for example in an oven, drying under vacuum, and the like. In one embodiment, the thermochromic ink composition is essentially free of solvent. As used herein, the term "essentially free of solvent" means that the thermochromic coating composition may contain less than about 0.1 weight percent of solvent based on the total weight of the thermochromic coating composition.

In various embodiments, the thermochromic optical-state change material, the thermally responsive pH modifier, the base, and the binder material, may be the same or similar to those discussed above for the thermochromic ink composition.

In one embodiment, the thermochromic coating composition has a maximum optical absorbance in a range of about 200 nm to about 800 nm. In another embodiment, the thermochromic coating composition has a maximum optical absorbance in a range of about 300 nm to about 700 nm. In yet another embodiment, the thermochromic coating composition has a maximum optical absorbance in a range of about 400 nm to about 650 nm. As discussed above, it will be appreciated that the specific wavelengths for which the absorbance of the composition is maximized may be chosen to correspond to a particular application.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage.

In one embodiment, the thermochromic coating composition is capable of irreversibly altering the state of functionality of the optical article. In the "pre-activated" state, at least one portion of the data from the optical data layer is unreadable by the incident laser of an optical data reader device, however, this same portion of data can be read from the optical data layer in the "activated" state of functionality.

The thermochromic ink composition and/or the thermochromic coating composition disclosed herein are capable of transforming from a first optical state to a second optical state upon exposure to either a direct or a remote thermal stimulus. As used herein, the term "direct" when used with respect to the application of the thermal stimulus to the thermochromic ink composition and/or the thermochromic coating composition refers to an embodiment wherein the thermal stimulus is in "direct" physical contact with the thermochromic ink composition and/or thermochromic coating composition. For example, an electrical device disposed in direct contact with the marks on the optical article may provide the activation signal when operably coupled with a POS equipment.

As used herein, the term "remote" when used with respect to the application of the thermal stimulus to the thermochromic ink composition and/or the thermochromic coating composition refers to an embodiment wherein the thermal stimuli is not in "direct" physical contact with the thermochromic ink composition and/or thermochromic coating composition. One example wherein the thermal stimuli is applied remotely to a thermochromic coating composition is an embodiment wherein at least a portion of the thermochromic coating composition is coated with an optically transparent second layer, which serves as a protective coating for the thermochromic coating composition from chemical and/or physical damage, and wherein the application of the thermal stimuli to the thermochromic coating composition is through the optically transparent second layer. Another example wherein the thermal stimuli is applied remotely to a thermochromic coating composition is an embodiment wherein a ray of light is incident on at least a portion of the thermochromic coating composition and the ray of light generates heat sufficient to transform the thermochromic coating composition from a first optical state to a second optical state.

In various embodiments of the invention, the optical article comprising the thermochromic coating composition may be transformed from a "pre-activated" state of functionality to an "activated" state of functionality. Conversion from the "pre-activated" state of functionality to the "activated" state of functionality is achieved by the activation of the thermochromic coating composition, which is deposited in or on the optical article, such that the thermochromic coating composition is in optical communication with the optical data layer. As used herein, the term optical communication refers to transmission and reception of light by optical devices. The thermochromic coating composition is activated by interacting with one or more thermal stimuli, applied either directly or remotely to the thermochromic coating composition. In one embodiment, the optical article may be activated using thermal activation methods known to one skilled in the arts. Non-limiting examples of the thermal activation methods include a wired activation method using a wired activation tag and a wireless activation method using a wirelessly-powered flexible tag which are operatively coupled to the thermochromic coating composition. The thermochromic coating composition is one part of an anti-theft system designed to prevent the unauthorized use of the optical article, designed to work in combination with additional components of the anti-theft system such as a removable wireless activation tag. Further details of the use of tags with optical articles as described herein can be found in U.S. patent application Ser. No. 11/567,271, filed Dec. 6, 2006.

In another embodiment, the optical article further comprises a microheater, resistor, or resistive heating element in thermal contact with the thermochromic coating composition. Further details of the use of microheater, resistor, or resistive heating element with optical articles as described herein can be found in U.S. patent application Ser. No. 11/567,271, filed Dec. 6, 2006.

Alternatively, the heating element may be in electrical communication with the electrical circuitry located in the packaging of the optical article. In one embodiment, the electrical circuitry may draw upon a source for electrical energy such as a battery or charged capacitor in the packaging. At the POS the electrical circuitry in the packaging may then form electrical connections with the activation source, thereby providing the electrical energy for heating the thermochromic coating. In certain embodiments, the packaging and/or tag comprises a battery configured to supply electrical energy to the thermochromic coating, wherein the battery is stimulated by the external stimulus. In these embodiments, the battery is not directly stimulated by the external stimulus, but rather provides power to heat the thermally responsive layer when the RF circuit is externally stimulated.

As used herein, the term "pre-activated" state of functionality refers to a state of functionality of the optical article where the thermochromic coating composition has not yet been exposed to one or more external stimuli, while the "activated" state refers to a state of functionality where the thermochromic coating composition has been exposed to the external stimuli. In one embodiment, the "pre-activated" state comprises at least one thermochromic coating composition which inhibits portions of the optical data layer that are located directly in the optical path of the incident laser of an optical data reader from being read. The activated state comprises a state of the optical article where the optical data layer can be read by the optical data reader as a result of the article being exposed to at least one external stimulus.

In another embodiment, at least one thermochromic coating composition is at least partially transparent to the incident laser of an optical data reader in the pre-activated state, allowing the data on the optical layer located directly in the optical path of the laser to be read. In this embodiment, the thermochromic coating composition at least partially absorbs the laser from the optical data reader in the activated state and prevents the data directly in the optical path of the laser from being read.

The change in the optical properties of the thermochromic coating composition upon activation can occur using at least two approaches. In the first approach, the thermochromic coating composition at least partially absorbs the incident laser from an optical data reader in the "pre-activated" state, and the data directly in the optical path of the laser cannot be read. In this instance, the content stored in the optical article below the thermochromic coating is unplayable. Upon converting the optical article to the "activated" state using an external stimulus, the thermochromic coating composition is at least partially transparent to the incident laser from an optical data reader, the data directly in the optical path of the laser can be read, and the content below the thermochromic optical coating is playable.

The second approach requires an additional "authoring" component, which allows the disc to be playable or unplayable, depending on whether portions of the data on the optical data layer can be read by the incident laser from an optical data reader. An explanation of the term "authoring" as it relates to an optical article, such as a DVD, can be found in "DVD Authoring and Production", by Ralph LaBarge, CMP Books, 2001. In this second approach, the thermochromic coating composition is at least partially transparent to the incident laser from an optical data reader in the "pre-activated" state, and the data directly in the optical path of the laser can be read. In this instance, the optical article is "authored" unplayable. Upon converting the optical article to the "activated" state using an external stimulus, the incident laser from the optical data reader thermochromic coating composition is at least partially absorbed by thermochromic coating composition, the data directly in the optical path of the laser cannot be read, and the disc is "authored" playable.

In one embodiment the term "damaged" state refers to a state of functionality of the optical article where the optical article has undergone a physical modification such as, but not limited to, a scratch, a dimple, or a physical modification in or on the optical article. The "damaged" state may be a result of improper activation of one or more optical-state change materials in or on the optical article. In the "damaged" state at least a portion of the optical data layer cannot be read by the laser of an optical data reader as a result of significant absorbance of the laser by at least a portion of at least one thermochromic optical-state change material. In contrast to the "activated" state, where all the thermochromic coating composition is sufficiently transparent to the laser from the optical data reader, in the "damaged" state at least a portion of the thermochromic coating composition absorbs at least a portion of the wavelength of the incident laser from the optical data reader and prevents the data directly in the optical path of the laser from being read.

In various embodiments, the article comprises one or more spots of the thermochromic coating composition wherein the spots have a first surface and a second surface. In embodiments where two or more spots are employed, each of the spots may be located at a unique location on the article, designed to function in concert as part of the anti-theft system. In one embodiment, at least two spots are in direct physical contact with each other, (i.e., juxtaposed next to each other). Suitable examples of two spots in direct physical contact include, but are not limited to, concentric lines, concentric arcs, concentric spots, patterned lines, patterned arcs, patterned spots, lines or arcs which are positioned end-to-end, or any combination thereof. In one embodiment, the article comprises at least two spots, wherein at least one spot is not transparent to the incident laser of an optical data reader in the "pre-activated" state. If the article is converted from the "pre-activated" state to the "damaged" state as a result of improper activation, the optical properties of each of the spots are designed to change irreversibly such that at least a portion of at least one of the spots absorbs the laser from the optical data reader, and prevents the data directly in the optical path of the laser from being read.

Upon interaction with one or more external stimuli, the optical absorbance of the thermochromic coating composition may be altered to change the functionality of the optical article from the pre-activated state to the activated state. For example, in the pre-activated state, the thermochromic coating composition may render the optical article unreadable by absorbing a portion of the wavelength from the incident laser of an optical data reader. However, upon interaction with an external stimulus the thermochromic coating composition becomes transparent to the wavelength of the laser used to read the optical article, thereby making the portion of the optical data layer which is located directly in the optical path of the laser from the optical data reader readable in the activated state. Suitable examples of external stimuli which can generate a thermal stimulus may include a laser, infrared radiation, thermal energy, X-rays, gamma rays, microwaves, visible light, ultraviolet light, ultrasound waves, radio frequency waves, microwaves, electrical energy, chemical energy, magnetic energy, or combinations thereof which generate a thermal stimulus. The interaction of the external stimulus with the optical article may include continuous, discontinuous, or pulsed forms of the external stimulus.

Alternatively, instead of being deposited on the surface of the optical article, the thermochromic coating composition may be deposited inside the structure of the optical article. In optical storage articles, the thermochromic coating composition may be deposited in the substrate on which the optical data layer is deposited. In such an embodiment, the thermochromic coating composition may be mixed with the substrate material of the optical article. In alternate embodiments, the thermochromic coating composition may be deposited between the layers of the optical article, or may be deposited within the layers of the optical article. For example, the thermochromic coating composition may be incorporated in the UV curable adhesive of the bonding (spacer) layer. It should be appreciated that these thermochromic coating compositions should be thermally stable to withstand the molding temperatures of the optical article. Also, these thermochromic coating compositions may preferably absorb the wavelength of the laser in one of the activated, or the pre-activated state of the optical article. Upon interaction with external stimulus, the thermochromic coating composition present inside the substrate changes color. As a result, the substrate may become transparent to the laser light, thereby facilitating the transmittance of laser light through the substrate and making the optical article readable.

In some embodiments, at least a portion of the thermochromic coating composition is coated with an optically transparent second layer. The optically transparent second layer serves as a protective coating for the thermochromic coating composition from chemical and/or physical damage. The optically transparent second layer may contain cross-linkable materials that can be cured using ultraviolet (UV) light or heat. Furthermore, the optically transparent second layer may be a scratch resistant coating. For example, the optically transparent second layer may include, but is not limited to, a matrix consisting of cross-linkable acrylates, silicones, and nano or micron silicate particles. Suitable examples of an optically transparent second layer can be found in U.S. Pat. No. 5,990,188.

EXAMPLES

Example 1

Provides a Thermochromic Ink Composition and a Method for Preparing the Same

A 20 milliliters vial was charged with 0.218 grams of bromothymol blue, 2.339 grams of dipropylene glycol methyl ether (Dowanol® DPM), 2.339 grams of diacetone alcohol, 0.3 grams of polymethylmethacrylate (PMMA) with a weight average molecular weight of about 15,000 as measured using gel permeation chromatography using polystyrene standards, 0.159 grams of dicyclohexyl amine, and 0.164 grams of dimethyl-4-methoxybenzylphenyl ammonium hexafluoroantimonate, (i.e., CXC1612 (K3), obtained from King Industries, Inc. (Norwalk, Conn.). The resultant mixture was stirred at about 25 degrees Celsius for about 4 hours to obtain a solution. until the polymer was completely dissolved.

Example 2

Provides a Thermochromic Ink Composition and a Method for Preparing the Same

A 20 milliliters vial was charged with 0.210 grams of Bromocresol green, 1.983 grams of Dowanol® DPM, 1.983 grams of diacetone alcohol, 0.3 grams of PMMA with a weight average molecular weight of about 15,000 as measured using gel permeation chromatography using polystyrene standards, 0.066 grams of dicyclohexyl amine, and 0.137 grams of CXC1612 (K3). The resultant mixture was stirred at about 25 degrees Celsius for about 4 hours to obtain a solution. until the polymer was completely dissolved.

Example 3

Provides a Thermochromic Ink Composition and a Method for Preparing the Same

A 20 milliliters vial was charged with 0.226 grams of sodium salt of Bromothymol blue, 1.971 grams of Dowanol® DPM, 1.971 grams of diacetone alcohol, 0.3 grams of PMMA with a weight average molecular weight of about 15,000 as measured using gel permeation chromatography using polystyrene standards, 0.143 grams of dicyclohexyl amine, and 0.041 grams of CXC1612 (K3). The resultant mixture was stirred at about 25 degrees Celsius for about 4 hours to obtain a solution. until the polymer was completely dissolved.

Example 4

Provides a Thermochromic Ink Composition and a Method for Preparing the Same

A 20 milliliters vial was charged with 0.226 grams of sodium salt of Bromothymol blue, 0.05 grams bis(2,4-dinitrophenyl)acetic acid ethyl ester, 1.971 grams of Dowanol® DPM, 1.971 grams of diacetone alcohol, 0.3 grams of PMMA with a weight average molecular weight of about 15,000 as measured using gel permeation chromatography using polystyrene standards, 0.143 grams of dicyclohexyl amine, and 0.041 grams of CXC1612 (K3). The resultant mixture was stirred at about 25 degrees Celsius for about 4 hours to obtain a solution in which the polymer was completely dissolved.

Example 5

Provides a Thermochromic Ink Composition and a Method for Preparing the Same

A 20 milliliters vial was charged with 0.226 grams of sodium salt of Bromothymol blue, 0.05 grams bis(2,4-dinitrophenyl)acetic acid ethyl ester, 2.426 grams of Dowanol® PM, 1.673 grams of diacetone alcohol, 0.3 grams of PMMA with a weight average molecular weight of about 15,000 as measured using gel permeation chromatography using polystyrene standards, 0.143 grams of dicyclohexyl amine, and 0.041 grams of CXC1612 (K3). The resultant mixture was stirred at about 25 degrees Celsius for about 4 hours to obtain a solution in which the polymer was completely dissolved.

Example 6

Provides a Thermochromic Coating Prepared Using the Thermochromic Ink Compositions of Example 1 to 5

The thermochromic coating was prepared by spin coating a 50 micro liter sample of the ink onto a DVD disc at 3000 RPM for about 30 seconds to produce a deep blue coating having a thickness of about 0.5 microns. The coated DVD's were allowed to dry at room temperature (about 22 degrees Celsius) for about 12 hours in a dessicator with air purge. These coated DVD's were used to measure kinetics of the coatings under various conditions. The results are included in Table 1, Table 2 and Table 3 below.

Table 1 provides the initial absorbance of the coating on the DVD before being subjected to any storage or thermal stimulus. Table 2 provides the absorbance of the coating on the DVD at different time intervals at a fixed temperature of about 50 degrees Celsius. The data in Table 2 represents the effect of storage on a coated DVD. Table 3 provides the absorbance of the coating on the DVD after being activated using a legitimate thermal stimulus as may be used by the sales person at a point-of-sale. The data in Table 3 provides the initial absorbance, absorbance after activation at 120 degrees Celsius and the difference in the absorbance. The absorbance of the thermochromic coating was measured using a fiber optic UV-Vis spectrometer (Ocean Optics Inc.) in reflectance mode. The measurements were made in triplicate and the average value of the percent reflectivity plotted as illustrated in FIG. 1 (data from Table 1), FIG. 2 (data from Table 2), and FIG. 3 (data from Table 3).

TABLE 1

| Example Number | Disc 1 | | | Disc 2 | | | Disc 3 | | | Percent Reflectivity |
|---|---|---|---|---|---|---|---|---|---|---|
| 1 | 25 | 23 | 22 | 17 | 15 | 16 | 24 | 25 | 22 | 21 |
| 2 | 18 | 20 | 21 | 23 | 23 | 17 | 16 | 16 | 18 | 19.1 |
| 3 | 21 | 22 | 22 | 30 | 27 | 24 | 31 | 27 | 26 | 25.6 |
| 4 | 19 | 19 | 20 | 23 | 25 | 27 | 15 | 16 | 19 | 20.3 |
| 5 | 18 | 17 | 17 | 16 | 16 | 15 | 15 | 15 | 14 | 15.9 |

TABLE 2

| Conditions Example | Percent Reflectivity 50 degrees Celsius, in presence of air | | | | | | | | | | | | | | |
|---|---|---|---|---|---|---|---|---|---|---|---|---|---|---|---|
| Number | 0 days | | | 3 days | | | 6 days | | | 10 days | | | 26 days | | |
| 1 | 17 | 15 | 16 | 34 | 28 | 27 | 34 | 29 | 28 | 41 | 36 | 35 | 42 | 38 | 38 |
| 2 | 22 | 23 | 17 | 34 | 30 | 27 | 3 | 34 | 31 | 41 | 38 | 34 | 49 | 47 | 42 |
| 3 | 30 | 27 | 24 | 42 | 36 | 35 | 40 | 38 | 34 | 49 | 45 | 45 | 50 | 47 | 50 |
| 4 | 23 | 25 | 27 | 40 | 40 | 40 | 38 | 36 | 36 | 47 | 45 | 45 | 49 | 50 | 49 |
| 5 | 16 | 16 | 15 | 15 | 16 | 16 | 14 | 15 | 14 | 16 | 16 | 16 | 17 | 16 | 16 |

TABLE 3

| | Percent Reflectivity | | |
|---|---|---|---|
| Example Number | Initial | After activation at 120 degrees Celsius | Difference in reflectivity |
| 1 | 30 | 90 | 60 |
| 2 | 35 | 54 | 19 |
| 3 | 30 | 92 | 62 |
| 4 | 20 | 90 | 70 |
| 5 | 16 | 89 | 73 |

As shown in Table 1, the percent reflectivity values range from about 15 to about 25. This indicates that the thermochromic ink composition prepared in Examples 1-5 when coated on a DVD effectively block the laser and prevent the DVD from booting and playing prior to activation. The thermochromic ink composition prepared in Example 5 provides the least initial reflectivity. Further on activation at 120 degrees Celsius to mimic the activation at a POS, as shown in Table 3, the percent reflectivity increases to about 54 to about 90. This indicates that the coating on the DVD is transformed from dark (blocking the laser) to translucent (allowing at least a part of the laser to pass through) during a 2 second activation allowing for the customer to play the DVD.

One skilled in the art will appreciate that there are at least three important criteria that must be met for a security technology to be successful. The first is that the ink spot must be dark enough so that all of the DVD players on the market will not boot or play when in the pre-activated state. Extensive testing with a large number of DVD players, including several popular game stations that double as DVD players such as Play Station and X-Box, has demonstrated that the percent reflectivity as measured by Ocean Optics spectrometer. In one embodiment, the optical reflectivity of the film after storage in the pre-activated state is less than or equal to about 25 percent. In another embodiment, the optical reflectivity of the film after storage pre-activated state is in a range of about 10 to about 23. In yet another embodiment, the optical reflectivity of the film after storage pre-activated state is in a range of about 15 to about 20.

Referring to FIG. 1 a bar chart 100 indicating the initial reflectivity of the thermochromic ink compositions prepared in Examples 1 to 5, when coated on an optical article is illustrated. The data represented in Table 1 is plotted as a bar chart with the percent reflectivity plotted on the Y-axis 110 and the corresponding ink compositions indicated in the X-axis 112. The first bar 114, the second bar 116, third bar 118, fourth bar 120, and the fifth bar 122 represent the percent reflectivity of the coating compositions prepared using the ink compositions prepared in Examples 1, 2, 3, 4 and 5 respectively. The value of the reflectivity clearly indicates that the composition of Example 5 provides the lowest reflectivity of less than about 15 percent and hence provides the darkest spot.

Figure 2:
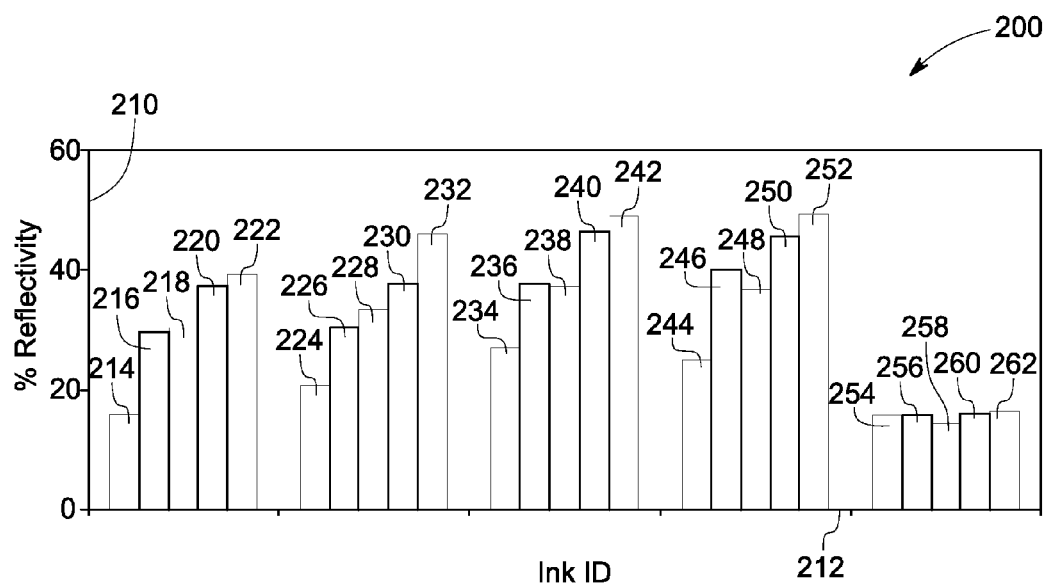
FIG. 2 illustrates the change in reflectivity of thermochromic coating compositions coated on an optical article under varying storage conditions, prepared in accordance with embodiments described herein.

The second criterion is that the spot must remain stable to bleaching for long periods of time, or have a reasonably long shelf or storage life. Referring to FIG. 2 a graph 200 indicating the change in reflectivity of thermochromic coating compositions coated on an optical article under varying storage conditions, prepared in Examples 1 to 5 is illustrated. The kinetics of the coatings on the DVD were studied at about 50 degrees Celsius for simulating accelerated shelf life. The data represented in Table 2 is plotted as a bar chart with the average value of the percent reflectivity plotted on the Y-axis 210 and the corresponding ink compositions indicated in the X-axis 212. The percent reflectivity was measured at 0 days, 3 days and 6 days, 10 days, and 26 days at a temperature of about 50 degrees Celsius. Table 4 below includes the reference numerals for the corresponding bars in the bar chart.

TABLE 4

| Reference Numeral | Example | Day at temperature in degrees Celsius |
|---|---|---|
| 214 | 1 | 0 at 50 |
| 216 | 1 | 3 at 50 |
| 218 | 1 | 6 at 50 |
| 220 | 1 | 10 at 50 |
| 222 | 1 | 26 at 50 |
| 224 | 2 | 0 at 50 |
| 226 | 2 | 3 at 50 |
| 228 | 2 | 6 at 50 |
| 230 | 2 | 10 at 50 |
| 232 | 2 | 26 at 50 |
| 234 | 3 | 0 at 50 |
| 236 | 3 | 3 at 50 |

TABLE 4-continued

| Reference Numeral | Example | Day at temperature in degrees Celsius |
|---|---|---|
| 238 | 3 | 6 at 50 |
| 240 | 3 | 10 at 50 |
| 242 | 3 | 26 at 50 |
| 244 | 4 | 0 at 50 |
| 246 | 4 | 3 at 50 |
| 248 | 4 | 6 at 50 |
| 250 | 4 | 10 at 50 |
| 252 | 4 | 26 at 50 |
| 254 | 5 | 0 at 50 |
| 256 | 5 | 3 at 50 |
| 258 | 5 | 6 at 50 |
| 260 | 5 | 10 at 50 |
| 262 | 5 | 26 at 50 |

The values of the reflectivities clearly indicate that the composition of Example 5 retains the lowest reflectivity of less than about 15 percent and hence provides the darkest spot even after being subjected to the accelerated storage conditions.

Figure 3:
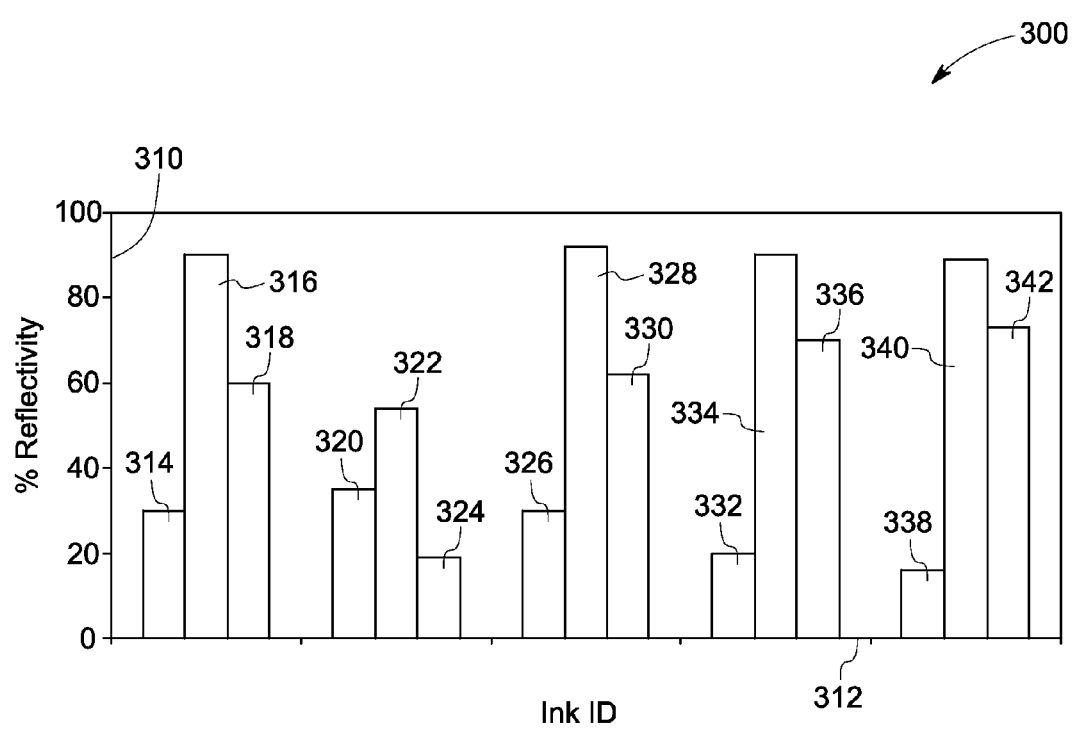
FIG. 3 illustrates the change in reflectivity of thermochromic coating compositions coated on an optical article after being subjected to a thermal activation, prepared in accordance with embodiments described herein.

The third criteria is that the spot must activate or change sufficiently from dark to translucent with heat that is sufficient but not so intense that it damages the DVD disc. FIG. 3 illustrates the change in reflectivity of thermochromic ink compositions when coated on an optical article after being subjected to thermal activation at about 120 degrees Celsius for about 2 seconds. A heater made from OhmegaPly® NiP materials with a sheet resistivity of 50 ohms per square patterned into a square of approximately 3 millimeters×3 millimeters was used to heat a spot of the thermochromic coating composition deposited onto the surface of a DVD. The figure shows the percent reflectivity of the ink compositions prepared in Examples 1 to 5, before and after thermal activation as well as the delta reflectivity. Referring to FIG. 3 a graph 300 indicating the change in reflectivity of thermochromic coating compositions coated on an optical article after being subjected to a thermal activation, prepared in Examples 1 to 5 is illustrated. The kinetics of the coatings on the DVD were studied at about 120 degrees Celsius for simulating activation at the POS. The data represented in Table 3 is plotted as a bar chart with the average value of the percent reflectivity plotted on the Y-axis 310 and the corresponding ink compositions indicated in the X-axis 312. The percent before activation, after activation, and the difference was measured. Table 5 below includes the reference numerals for the corresponding bars in the bar chart.

TABLE 5

| Reference Numeral | Example | Percent Reflectivity before/after/difference | Reference Numeral | Example | Day at temperature in degrees Celsius |
|---|---|---|---|---|---|
| 314 | 1 | Before | 330 | 3 | Difference |
| 316 | 1 | After | 332 | 4 | Before |
| 318 | 1 | Difference | 334 | 4 | After |
| 320 | 2 | Before | 336 | 4 | Difference |
| 322 | 2 | After | 338 | 5 | Before |
| 324 | 2 | Difference | 340 | 5 | After |
| 326 | 3 | Before | 342 | 5 | Difference |
| 328 | 3 | After | | | |

Again, while all the ink formulations showed acceptable results, the fifth formulation started out as the darkest and also showed the largest delta. Player testing with a large number of different DVD players has showed that the reflectivity of a thermally stimulated coating, in one embodiment, may be in a range of about 40 percent to about 100 percent. In another embodiment, the optical reflectivity of the film after interaction with the thermal source is in a range of about 65 percent to about 98 percent. In yet another embodiment, the optical reflectivity of the film after interaction with the thermal source is in a range of about 90 percent to about 95 percent.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

The invention claimed is:

1. A thermochromic ink composition comprising;
   at least one thermochromic optical-state change material, at least one thermally responsive pH modifier, at least one base, at least one binder material; and a solvent; wherein the thermochromic optical-state change material comprises bis (2,4-dinitrophenyl)acetic acid ethyl ester; wherein the solvent is propylene glycol methyl ether, dipropylene glycol methyl ether, or mixture thereof; wherein the binder material comprises one or more of a polymer, an oligomer, a polymeric precursor, or a polymerizable monomer; wherein the quantity of the thermally responsive pH modifier is less than or equal to about 0.25 milli moles based on the amount of optical-state change material; and wherein the ink composition is capable of transforming from a first optical state to a second optical state upon exposure to a thermal stimulus.

2. The thermochromic ink composition as defined in claim 1, wherein the quantity of the thermally responsive pH modifier is in a range of from about 0.01 milli moles to about 1 milli mole based on the amount of optical-state change material.

3. The thermochromic ink composition as defined in claim 1, wherein the thermally responsive pH modifier is selected from one or more of sulfonic acid salts, phosphoric acid salts, hydrochloric acid salts, triflic acid salts, alkali metal salts, amine salts, ammonium salts, iodonium salts, and benzoic acid.

4. The thermochromic ink composition as defined in claim 1, wherein the amount of the nitro dye is less than or equal to about 0.5 milli moles based on the amount of the thermochromic optical-state change material.

5. The thermochromic ink composition as defined in claim 1, wherein the amount of the thermochromic optical-state change material is in a range of from about 25 weight percent to about 35 weight percent based on the weight of a coating formed using the composition.

6. The thermochromic ink composition as defined in claim 1, wherein the base is selected from one or more of ammonia, triethylamine, methyl amine, cyclohexylamine, dicyclohexylamine, 1,8-bis(dimethylamino)naphthalene, 1,4-diazabicyclo[2.2.2]octane, pyridine, imidazole, potassium hydroxide, and sodium hydroxide.

7. The thermochromic ink composition as defined in claim 1, wherein the amount of the base is in a range of from about 0.5 milli moles to about 4.0 milli mole equivalents based on the amount of the thermochromic optical-state change material.

8. The thermochromic ink composition as defined in claim 1, wherein the amount of the solvent is in a range of from about 80 weight percent to about 90 weight percent based on the weight of the ink composition.

9. The thermochromic ink composition as defined in claim 1, wherein the amount of the binder material is in a range from about 20 weight percent to about 60 weight percent based on a weight of a coating formed using the composition.

10. The thermochromic ink composition as defined in claim 1, wherein the binder material comprises one or more of a polyolefin, a polyester, a polyamide, a polyacrylate, a polymethacrylate, a polyvinylchloride, a polycarbonate, a polysulfone, a polysiloxane, a polyetherimide, a polyetherketone, or a copolymer thereof.

11. The thermochromic ink composition as defined in claim 1, wherein the thermochromic ink composition is transformed from the first optical state to the second optical state in a temperature range from about 25 degrees Celsius to about 200 degrees Celsius.

12. The thermochromic ink composition as defined in claim 1, wherein the time taken for a coating comprising the thermochromic ink composition in an optical article to bleach in presence of a thermal source is less than or equal to about 6 seconds.

13. The thermochromic ink composition as defined in claim 12, wherein the optical reflectivity of the coating after interaction with the thermal source is in a range of about 40 percent to about 100 percent.

14. The thermochromic ink composition as defined in claim 1, wherein the time taken for a coating comprising the thermochromic ink composition in an optical article to bleach under storage at a temperature of about 25 degrees Celsius to about 50 degrees Celsius is about 3 months to about 24 months.

15. The thermochromic ink composition as defined in claim 14, wherein the optical reflectivity of the coating after storage is less than or equal to 30 percent.

16. A thermochromic ink composition comprising;
at least one thermochromic optical-state change material consisting of sodium salt of bromothymol blue, at least one nitro dye having a formula I

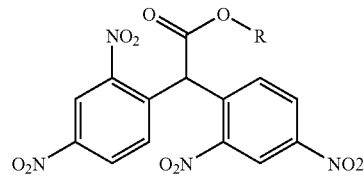

wherein R comprises hydrogen or an alkyl group having 1 to 8 carbons, at least one thermally responsive pH modifier, at least one base, and at least one binder material; wherein the quantity of the thermally modified pH modifier is less than or equal to about 0.25 milli moles based on the thermochromic optical-state change material; and wherein the ink composition is capable of transforming from a first optical state to a second optical state upon exposure to a thermal stimulus.

17. A thermochromic coating composition comprising;
at least one thermochromic optical-state change material, at least one thermally responsive pH modifier, at least one base, and at least one binder material; and a solvent; wherein the thermochromic optical-state change material comprises bis (2,4-dinitrophenyl)acetic acid ethyl ester; wherein the solvent is propylene glycol methyl ether, dipropylene glycol methyl ether, or mixture thereof; wherein the binder material comprises one or more of a polymer, an oligomer, a polymeric precursor, or a polymerizable monomer; wherein the quantity of the thermally modified pH modifier is less than or equal to about 0.25 milli moles based on the optical-state change material; wherein the coating composition is capable of transforming from a first optical state to a second optical state upon exposure to a thermal stimulus; and wherein the coating composition is essentially free of solvent.

* * * * *